United States Patent Office 2,838,178
Patented June 10, 1958

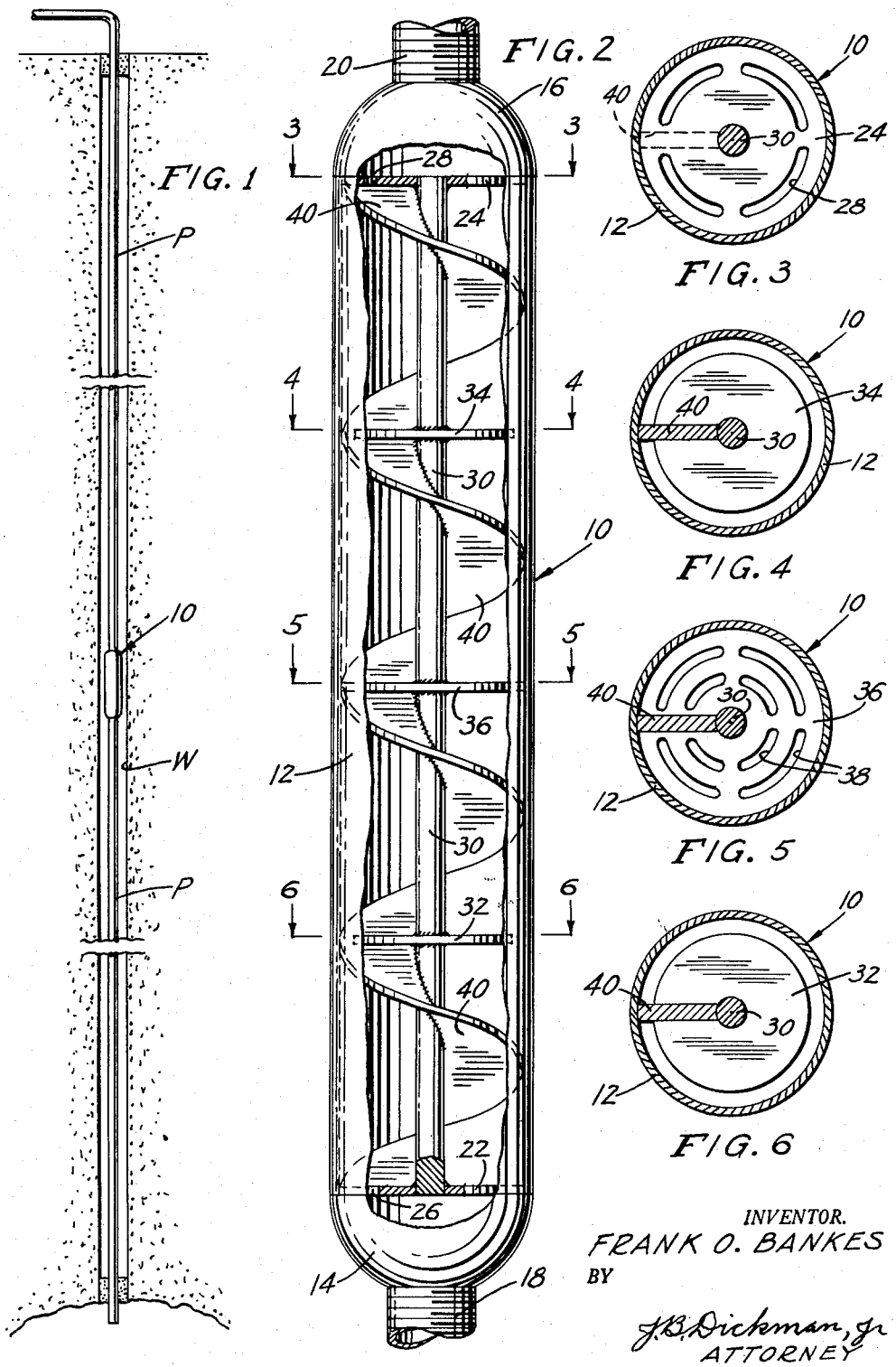

2,838,178
DEVICE FOR SEPARATING CRUDE OIL FROM WATER

Frank O. Bankes, Oklahoma City, Okla.

Application March 22, 1955, Serial No. 495,975

2 Claims. (Cl. 210—170)

This invention relates to the separation of the crude oil from the water in an emulsion thereof such as flows from a well during the extraction of oil therefrom.

Crude oil flowing from oil wells is often mixed with water. This water must be separated from the oil before the oil is transported from the site of the well. Various chemical agents may be added to the crude oil to speed up and make more complete the separation of the water from the oil in separation tanks into which the crude oil is delivered for the separation. These chemicals must be thoroughly mixed with the crude oil in order to have maximum effect. It is desirable therefore that an agitating device be provided through which the mixture of crude oil and chemicals can pass on its way to the separation tank which will agitate the mixture thoroughly thus effecting a very thorough mixture of the chemical with the crude oil.

The primary object of this invention is to break the film of emulsifying agent surrounding each minute globule of water so as to free it and enable it to coalesce with like water globules until a water globule or droplet has formed of a size sufficient to cause its complete separation from the oil and consequent precipitation therein.

Another object is to create turbulence in a flowing stream of oil and water emulsion and to cause the water globules to impinge against barriers with sufficient force to break their surrounding films.

The above and other objects may be attained by employing this invention which embodies among its features an elongated tubular flow chamber, longitudinally spaced baffles carried by and extending transversely across the interior of the chamber, said baffles having non-registering flow passages extending therethrough and helical deflectors carried by the flow chamber and extending between the baffles.

Other features include an elongated tubular flow chamber, supporting disks carried by the flow chamber and extending transversely thereacross adjacent ends thereof, said disks having flow passages extending therethrough, a support rod carried by the disks and extending longitudinally therebetween in alignment with the axis of the chamber, baffles carried by the support rod and extending outwardly therefrom within the flow chamber, and a helical deflector carried by the rod and extending outwardly therefrom and into contact with the wall of the flow chamber to cause liquid entering said flow chamber to move therethrough in a helical path.

Still other features include longitudinally spaced imperforate baffles carried by the rod and extending outwardly therefrom with their peripheries in concentric spaced relation to the wall of the chamber.

In the drawings:

Figure 1 is a diagrammatic elevational view of a pipe line with the device positioned therein.

Figure 2 is an elevational view of the device with a portion broken away to show the interior of the housing.

Figure 3 is a sectional view taken on line 3—3 of Figure 2.

Figure 4 is a sectional view taken on line 4—4 of Figure 2.

Figure 5 is a sectional view taken on line 5—5 of Figure 2.

Figure 6 is a sectional view taken on line 6—6 of Figure 2.

Referring to the drawing in detail, a well W has extending thereinto a flow pipe P through which the crude oil and water emulsion is extracted from the well W in any conventional manner. In order to break the emulsion and to promote the precipitation of the water from the oil, a separator designated 10 embodying the features of this invention is connected into the flow pipe P intermediate the ends thereof.

The separator 10 comprises an elongated tubular body 12 defining a flow chamber and carried by the opposite ends of said body 12 are hollow dome shaped extensions 14 and 16 carrying couplings 18 and 20 to which adjacent ends of the flow pipe P are connected. It is to be noted that the capacity of the tubular body 12 is substantially twice the capacity of the pipe P.

Carried by the tubular body 12 adjacent the dome shaped extensions 14 and 16 respectively are supporting disks 22 and 24. The disk 22 is perforated as at 26 to establish communication between the dome shaped extension of the body 12, and the disk 24 is perforated as at 28 to establish communication between the interior of the body 12 and the dome shaped extension 16.

A rod 30 is welded or otherwise secured to the disks 22 and 24 and extends therebetween axially of the body 12. Longitudinally spaced baffle disks 32 and 34 are carried by the rod 30 and extend laterally outwardly therefrom with their peripheries in concentric spaced relation to the tubular body 12 to define annular passages through which passes the liquid as it leaves the well.

A transversely extending annular partition 36 is carried by the rod 30 substantially midway between the disks 22 and 24 and like the disks 22 and 24 is provided with concentrically spaced arcuate perforations 38. A helical flange 40 is carried by the rod 30 and extends between the disks 22 and 24 and the baffles 32 and 34 and partition 36. The outer edge of the helical flange engages the inner periphery of the tubular body to define therewith a helical passage through which passes the oil on the way to the surface.

In use with the separator 10 connected into the well pipe P as illustrated in Figure 1, oil or an emulsion of oil and water will be directed in a helical path through the tubular body 12 and will encounter the baffles 32 and 34 and the partition 36. The impact of the globules of water against the baffles and partition coupled with the agitation caused by the swirling of the liquid as it moves upwardly through the separator will cause the films encompassing the water globules to be ruptured so as to free the water globules and permit them to coalesce into droplets which will precipitate out of the oil and facilitate separation of the water from the oil. The separator is located below what is commonly referred to as the "parafine line" and may be employed either with or without the use of chemical compounds which promote the precipitation of the water.

The details shown in the drawing illustrate one form of the invention, there being obvious modifications that may be made in the arrangement and detail forms of the several parts without departing from the spirit and scope of the present invention, as defined in the appended claims.

What is claims is:

1. A separator comprising an elongated tubular body defining a flow chamber, perforated supporting disks carried by the body and extending across opposite ends thereof, a supporting disk carried by the body midway the opposite ends, a rod carried by the disks and extending longitudinally therebetween along the axis of the body, longitudinally spaced baffles carried by the rod and extending outwardly therefrom between the supporting disks, the peripheries of said baffles lying in concentric spaced relation to the tubular body, and a helical flange carried by the rod and extending between the supporting disks with its outer edge in contact with the tubular body.

2. A separator comprising an elongated tubular body defining a flow chamber, supporting disks carried by the body and extending across opposite ends thereof, circumferential openings in said disks at opposite ends of the body, a supporting disk having a plurality of concentric circumferential openings carried by the body midway the opposite ends, a rod carried by the disks and extending longitudinally therebetween along the axis of the body, longitudinally spaced baffles carried by the rod and extending outwardly therefrom between the supporting disks, the peripheries of said baffles lying in concentric, spaced relation to the tubular body, and a continuous helical flange carried by the rod and extending between the supporting disks with its outer edge in contact with the tubular body.

References Cited in the file of this patent

UNITED STATES PATENTS

| | | |
|---|---|---|
| 1,626,487 | Warren | Apr. 26, 1927 |
| 2,000,953 | Hooker et al. | May 14, 1935 |
| 2,382,490 | Lawlor | Aug. 14, 1945 |
| 2,624,462 | Williams | Jan. 6, 1953 |